US011615252B2

(12) United States Patent
Wei et al.

(10) Patent No.: US 11,615,252 B2
(45) Date of Patent: Mar. 28, 2023

(54) VIRTUAL ASSISTANTS FOR EMERGENCY DISPATCHERS

(71) Applicant: D8AI Inc., Taipei (TW)

(72) Inventors: Yin-Hsuan Wei, Taipei (TW); Angela Chen, New Taipei (TW); Yuh-Bin Tsai, Taichung (TW); Fu-Chieh Chang, Taipei (TW); You-Zheng Yin, Taipei (TW); Zai-Ching Wen, New Taipei (TW); Pei-Hua Chen, Taipei (TW); Hsiang-Pin Lee, Taipei (TW); Richard Li-Cheng Sheng, Davis, CA (US); Hui Hsiung, Pasadena, CA (US)

(73) Assignee: D8AI Inc., Taipei (TW)

( * ) Notice: Subject to any disclaimer, the term of this patent is extended or adjusted under 35 U.S.C. 154(b) by 106 days.

(21) Appl. No.: 17/319,114

(22) Filed: May 13, 2021

(65) Prior Publication Data

US 2022/0366146 A1  Nov. 17, 2022

(51) Int. Cl.
*G10L 15/00* (2013.01)
*G06F 40/35* (2020.01)
*G06Q 50/26* (2012.01)
*G06F 40/40* (2020.01)
*G06F 40/284* (2020.01)

(52) U.S. Cl.
CPC ............ *G06F 40/35* (2020.01); *G06F 40/284* (2020.01); *G06F 40/40* (2020.01); *G06Q 50/265* (2013.01)

(58) Field of Classification Search
CPC ........ G06F 40/35; G06F 40/284; G06F 40/40; G06Q 50/265
See application file for complete search history.

(56) References Cited

U.S. PATENT DOCUMENTS

| 10,115,283 B1* | 10/2018 | Sokolov | G08B 21/0453 |
| 10,943,463 B1 | 3/2021 | Clark | |
| 2018/0325469 A1* | 11/2018 | Fountaine | H04N 21/2187 |
| 2019/0266236 A1* | 8/2019 | Battach | G06N 3/045 |
| 2020/0104369 A1* | 4/2020 | Bellegarda | G06F 40/30 |
| 2020/0364303 A1* | 11/2020 | Liu | G06N 3/045 |

* cited by examiner

Primary Examiner — Paras D Shah
Assistant Examiner — Uthej Kunamneni
(74) Attorney, Agent, or Firm — Winston Hsu

(57) ABSTRACT

A dispatcher virtual assistant (DVA) that can augment the capability of emergency dispatchers while reducing human errors. Major functions of the DVA include updating an emergency incident's status in real time, recommending or reminding the dispatcher to take proper actions at the right timing, answering the dispatcher's inquiries for task-related information, and fulfilling the dispatcher's request for an incident report. The DVA system includes a dispatcher language model based on machine-learning and deep-learning algorithms, for extracting the status of a live incident from incoming incident logs, and for processing and answering inquiries or requests from the dispatcher. It is customizable for different types of emergencies and for different local communities. The DVA can be used in tandem with an existing CAD system.

3 Claims, 3 Drawing Sheets

VIRTUAL ASSISTANTS FOR EMERGENCY DISPATCHERS

BACKGROUND OF THE INVENTION

1. Field of the Invention

The subject matter disclosed herein relates generally to virtual assistants, chatbots, natural language processing, robotic process automation, emergency dispatchers and computer-aided dispatch. The present disclosure describes systems and methods of virtual assistants for emergency dispatchers.

2. Description of the Prior Art

Life-threatening situations, such as structure or vehicle fires, medical emergencies, or criminal incidents, occur in any populated community on a daily basis. The reporting of such incidents is usually initiated by citizens making emergency calls (for example, 9-1-1 calls). Call-takers in a dispatch center take these calls and relay them to a dispatcher. Based on the calls, the dispatcher gathers clues, coordinates with and deploys first-responder units to the emergency scene. Depending on the nature of an emergency, the first responders can be firefighters, paramedics, or law-enforcement officers. Throughout the emergency response process, execution and timing are both critical to the outcome of an emergency. Mere seconds in time can result in more lives saved or lost.

Among the stakeholders of the emergency response workflow, the dispatcher clearly plays a central role. A dispatcher needs to sort out incoming calls—sometimes tens or even hundreds per incident—in real time, assess the incident status dynamically, deploy first-responder units most suitable for the rescuing job, and provide them with high-quality, critical information that allows them to form an early understanding of what they will be facing upon arrival at the emergency scene. While in the field, first responders also need to report their onsite assessments back to the dispatcher, as well as to obtain further information from the dispatcher about the incident.

A modern dispatch center is usually equipped with a computer-aided dispatch (CAD) system (see, for example, U.S. Department of Homeland Security, Science and Technology, "Computer Aided Dispatch Systems", TechNote (2011), available at: https://www.dhs.gov/sites/default/files/publications/CAD_TN_0911-508.pdf). The CAD is an integrated system for entering, sending, and logging messages to facilitate the emergency response workflow. Using the CAD, call-takers input information about a call, including incident location, caller identity, incident type (fire, injury, burglary, etc.), and a synopsis of the call content. A dispatcher uses the CAD to track and update the status of an incident, as well as to communicate with first responders. More advanced CAD systems are equipped with geographic information systems and automatic vehicle location, which help first responders arrive at the emergency scene faster. All messages passing through and information generated in the CAD system are timestamped and logged. The logs are stored and searchable.

Such an emergency response workflow is not robust due to its critical dependency on the skillfulness, experience and maturity of the dispatcher. Specifically, the dispatcher not only needs to sort out a large amount of information about an incident sent from call-takers and first responders but also has to update the status of the incident up to the second—often manually. Prior CAD systems can help integrate the information flows, but they do not solve the above problem fundamentally.

Post-incident, it is a common procedure for the dispatcher or his/her supervisor to prepare an incident report summarizing significant facts of the entire emergency event and its handling. Sorting fragmented incident logs into a report is a time-consuming, manpower-intensive process.

The above issues are further compounded by the emergency-management job sector having a low supply of dispatchers and a high employee turnover. Training new dispatchers is both costly and time-consuming. This can be detrimental to the operation of any dispatch center.

Aiming at solving these problems, the present invention provides systems and methods of virtual assistants for emergency dispatchers. Based on machine learning and deep learning, the solutions are automated, reducing the workload and response time of dispatchers and consequently, minimizing chances for human errors.

SUMMARY OF THE INVENTION

The present invention provides dispatcher virtual assistants (DVA) that can augment the capability of emergency dispatchers while reducing human errors. Major functions of the DVA include updating an emergency incident's status in real time, recommending or reminding the dispatcher to take proper actions at the right timing, answering the dispatcher's inquiries for task-related information, and fulfilling the dispatcher's request for an incident report. The DVA system consists of a virtual assistant control unit, a dispatcher language model, an incident-status tracker, a natural language generator, a database and a graphic user interface. It can be used in tandem with an existing CAD system. Furthermore, the DVA can be used as a cost-effective, interactive dispatcher trainer.

Based on machine-learning and deep-learning algorithms, the dispatcher language model is used for extracting the status of a live incident from incoming incident logs, and for processing and answering inquiries or requests from the dispatcher. It is also customizable for different types of emergencies and different local communities.

These and other objectives of the present invention will no doubt become obvious to those of ordinary skill in the art after reading the following detailed description of the preferred embodiment that is illustrated in the various figures and drawings.

DETAILED DESCRIPTION

1. The Dispatcher Virtual Assistant System

Figure 1:
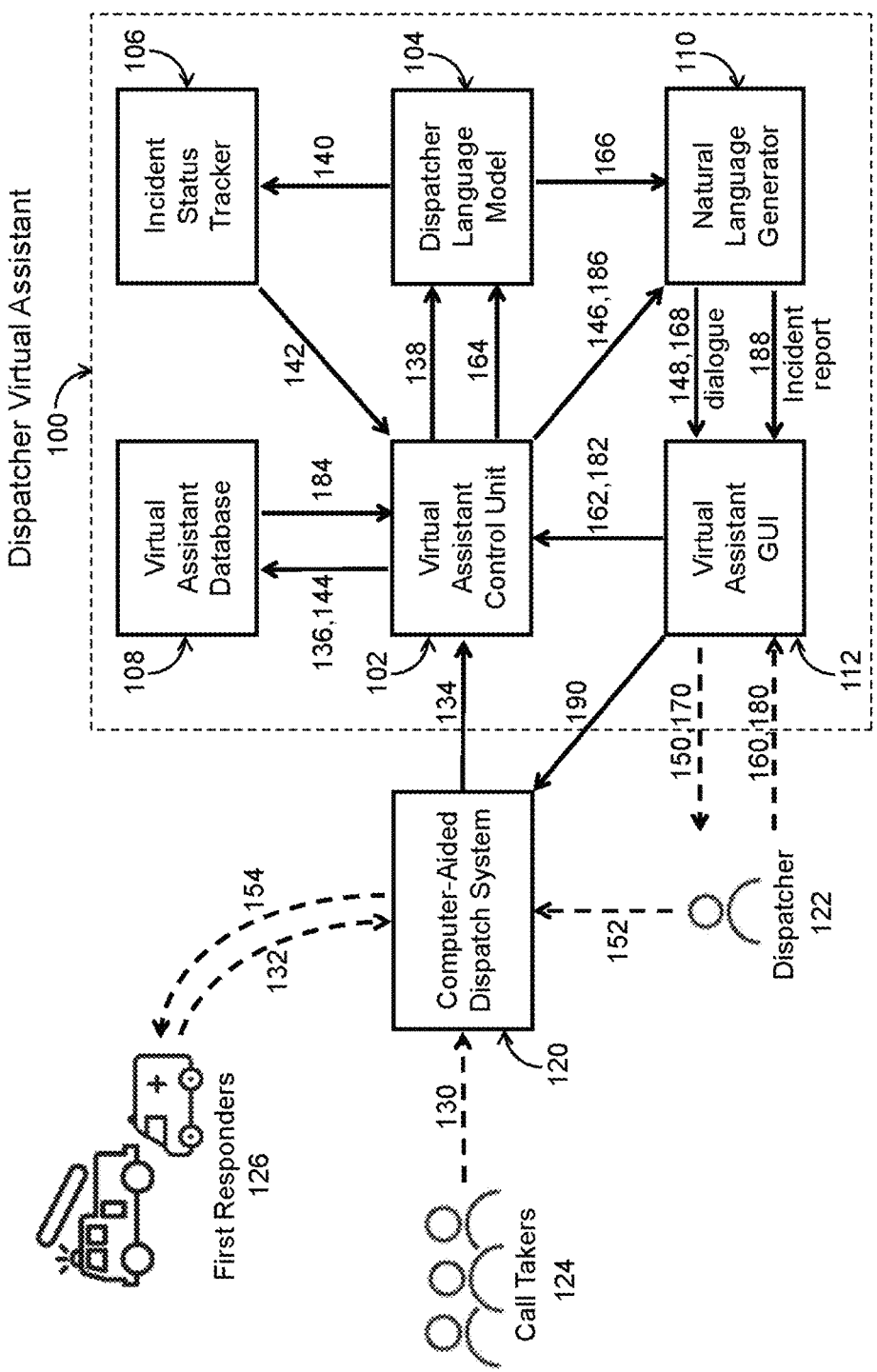
FIG. 1 is a block diagram of the Dispatcher Virtual Assistant system (marked by the dashed box) used in tandem with a computer-aided dispatch system, consistent with some embodiments of the present invention. The information flows within the DVA system and that between the DVA and CAD systems are indicated with solid arrows. The information flows between the human stakeholders (dispatcher, call-takers and first responders) and the DVA and CAD systems are indicated with dashed arrows.

FIG. 1 illustrates an embodiment of the present invention. The Dispatcher Virtual Assistant (DVA) system 100 for emergency dispatchers comprises a VA Control Unit 102, a Dispatcher Language Model 104, an Incident Status Tracker 106, a VA Database 108, a Natural Language Generator 110, and a VA Graphic User Interface (VA-GUI) 112. Although the DVA can be utilized as a stand-alone system, its implementation is more efficient when used in tandem with a computer-aided dispatch (CAD) system 120, as shown in FIG. 1. The communication between the DVA and CAD systems is accomplished with an application programming interface (API). Functions of individual components of the DVA system are described in the following.

The VA Control Unit 102, the heart of the DVA system, is responsible for directing the flows, processing, and storage of data within the DVA system. It receives textual data from the CAD system 120 and the VA-GUI 112, and it sends the data to the Dispatcher Language Model 104 for processing. Depending on incident-status values it obtains from the Incident Status Tracker 106 and the inquiries or requests it receives from the Dispatcher 122, the VA Control Unit 102 instructs the Natural Language Generator 110 to produce either dialogue messages or incident reports for the Dispatcher 122 to read or to dispatch. The VA Control Unit 102 is also responsible for storing or retrieving incident data (incident logs and status) to and from the VA Database 108.

Figure 2:
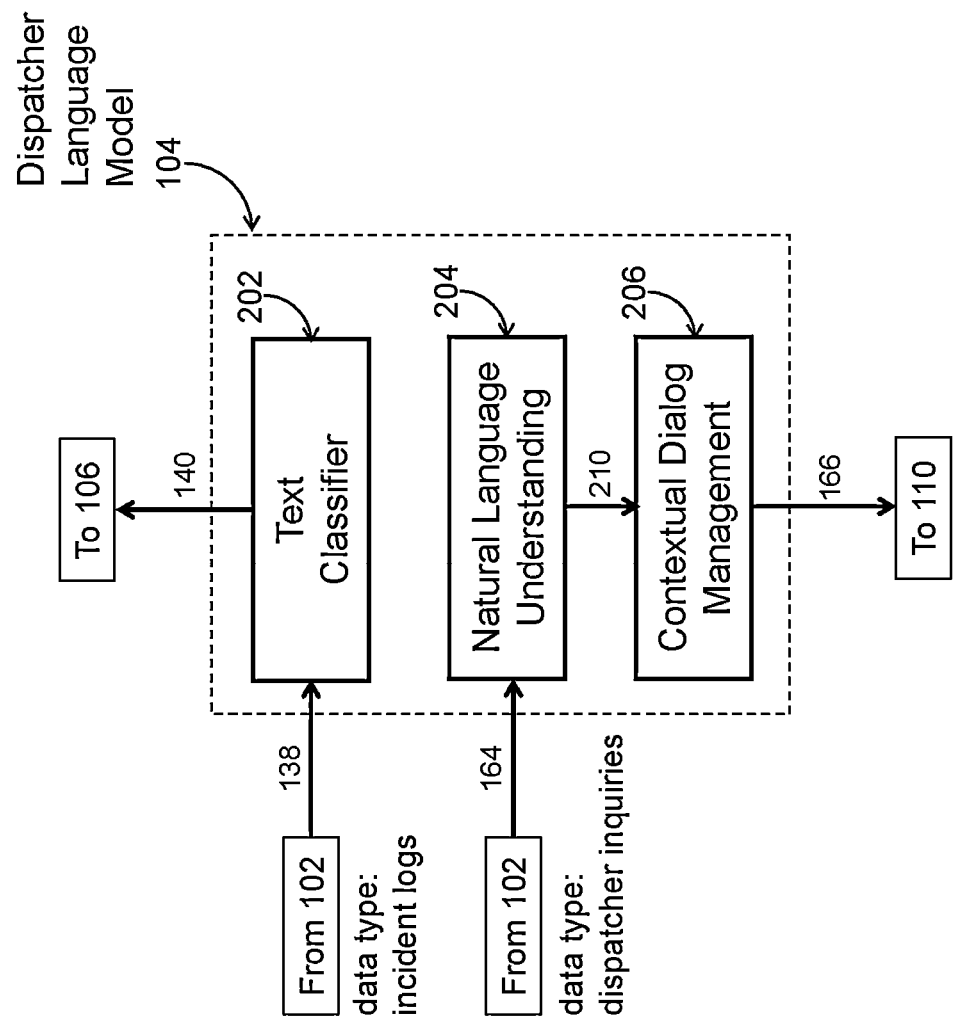
FIG. 2 is a block diagram of the architecture of the Dispatcher Language Model depicted in FIG. 1, consistent with some embodiments of the present invention.

The Dispatcher Language Model 104 is responsible for processing textual data using natural-language-processing methods involving machine learning and deep learning algorithms. It can process at least two types of data: incident logs received from the CAD system 120 and inquiries or requests received via the VA-GUI 112 from the Dispatcher 122. As shown in FIG. 2, the respective methods and objectives for processing these two types of data are different. From incident logs, a Text Classifier 202 is used to extract text fragments (words or phrases) containing the status information of an emergency event. For dispatcher inquires, a Natural Language Understanding (NLU) model 204 is used to analyze the intent of each inquiry, and a Contextual Dialog Management (CDM) model 206 is used to analyze the context of that inquiry. The combined objective of the NLU and CDM models is for the VA Control Unit 102 to understand the intent and context of each dispatcher inquiry and provide the best response for it via the Natural Language Generator 110. The Text Classifier 202, the NLU model 204 and the CDM model 206 are capable of processing textual data on a per-sentence basis in real time, and accordingly, the Dispatcher Virtual Assistant 100 can provide instant services to the Dispatcher 122.

The Incident Status Tracker 106 takes the output of the Text Classifier 202 and from which deduces the status of an incident. Incident logs are unstructured textual data entered by the Call Takers 124, the First Responders 126 and the Dispatcher 122. To analyze the logs using the Text Classifier 202, the present invention provides an incident-status object containing a number of properties, with each property describing one aspect of the incident. For example, the incident-status object for a building fire contains properties such as: building type (single-family house, apartments/condos, office, shopping mall, hotel, school, hospital, factory, warehouse, etc.), building construction (wood frame, joisted masonry, concrete frame, steel frame, etc.), building height (number of stories), floor of fire, stage of fire (incipient, growth, fully developed, decay), color of smoke, visibility of fire, missing people, casualty information, etc. The properties are specific to incident types, and collectively, they must be able to describe sufficiently the status of an incident of the particular type (fire, medical, criminal, etc.). As an emergency progresses, values of the incident-status properties are automatically extracted and updated from incoming incident logs by the Text Classifier 202 and the Incident Status Tracker 106. Based on the current status of an incident, the VA Control Unit 102 provides recommendations to the Dispatcher 122 for the proper actions to take at the right timing.

The Virtual Assistant Database 108 stores timestamped incident logs and incident-status data for the VA Control Unit 102 to retrieve and use at runtime. It can also keep task-related information useful for conducting various dispatcher tasks. To retrieve a piece of information anytime during an operating or training session, the Dispatcher 122 can simply send an inquiry to the Dispatcher Virtual Assistant 100 via the VA-GUI 112.

The Natural Language Generator 110 follows the instruction of the VA Control Unit 102 to produce responses to the Dispatcher 122 in various formats: dialogue messages, incident reports, or other forms of information, depending on the use situation. To avoid any unexpected response during the mission-critical dispatcher tasks, algorithms for the Natural Language Generator 110 are preferred to be rule-based rather than machine-learning-based.

The Virtual Assistant GUI 112 serves as the user interface between the Dispatcher 122 and the Dispatcher Virtual Assistant 100. While text and graphics are the primary media of communication between the two, speech communication can be an option for the VA-GUI 112.

Hardware for implementing the Dispatcher Virtual Assistant 100 should include at least a computer server, a digital display, and standard I/O devices such as keyboard, mouse, touch screen, microphone and speaker.

A single Dispatcher Virtual Assistant 100 may provide services for multiple dispatcher tasks in handling various types of emergency. For fire emergency, building fires, vehicle fires and wildfires are handled as three different tasks having task-specific emergency response workflows. Different DVA tasks need to be separately customized. Furthermore, due to regulatory or practical considerations, a DVA may need to be customized for different local communities even for the same dispatcher task. The modularized architecture of the DVA system 100 of the present invention allows customizations to be carried out more efficiently. For example, using the same software engines of the Text Classifier 202, the NLU 204 and the CDM 206, task-specific versions of the Dispatcher Language Model 104 can be prepared by training the natural language models therein with separate task-specific data sets.

2. The Incident Status Extraction

Figure 3:
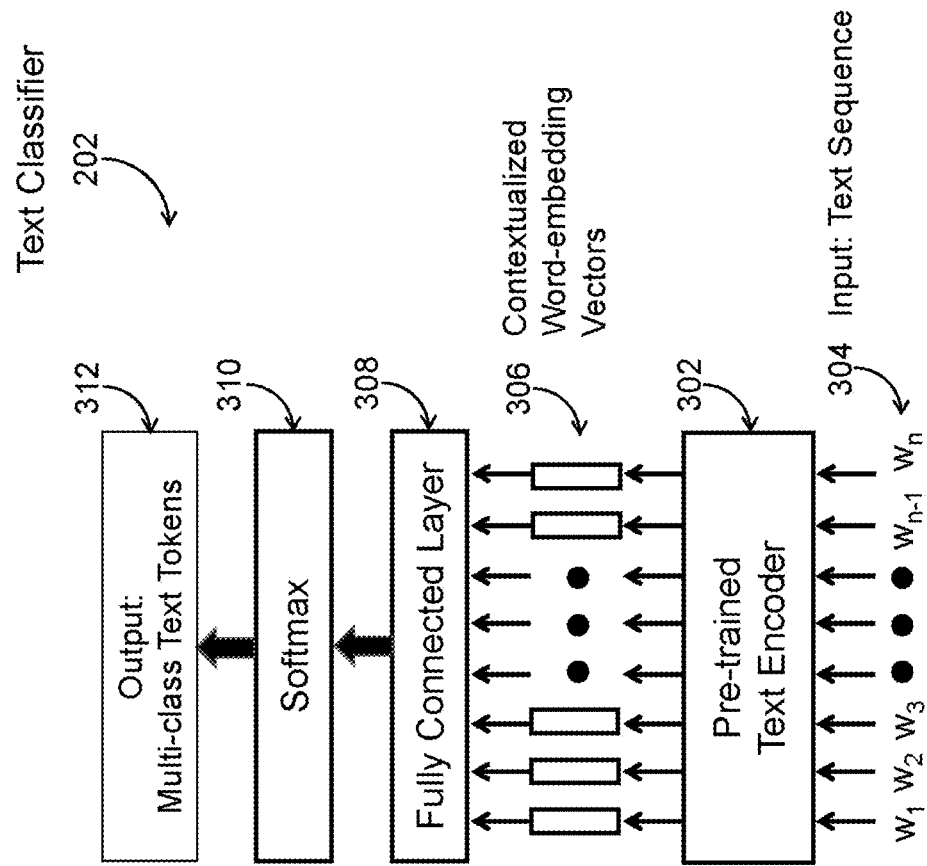
FIG. 3 is a block diagram of the architecture of the Text Classifier depicted in FIG. 2, consistent with some embodiments of the present invention.

FIG. 3 illustrates an embodiment of the Text Classifier 202 used for extracting incident-status information from incident logs. The core of the Text Classifier 202 is a Pre-trained Text Encoder 302, which is a Transformer-based deep-learning model of the BERT family.

The BERT model, originally developed by Google, is a text encoder that takes a tokenized text sequence 304 ($w_1$ to $w_n$, where n is the maximum number of the input text tokens) as input and provides for each token a contextualized word-embedding vector 306 as output (for the BASE version of BERT: n=512 and the embedding-vector dimension is 768; see J. Devlin, M. W. Chang, K. Lee, K. Toutanova, "BERT: Pre-training of Deep Bidirectional Transformers for Language Understanding", arXiv: 1810.04805 (2019)). The BERT model has been pre-trained on a large corpus of text containing a vocabulary of some 30,000 text tokens (words and sub-words), and hence it is used as a generic text encoder. Aimed at improving the original BERT model, a number of BERT derivatives have been developed and pre-trained (see, for example, the review article by A. Rogers, O. Kovaleva, A. Rumshisky, "A Primer in BERTology: What We Know About How BERT Works", arXiv:2002.12327 (2020)). ELECTRA is a more recent addition to the BERT family that has seen a great deal of success in natural language processing (K. Clark, M. T. Luong, Q. V. Le, C. D. Manning, "ELECTRA: Pre-training Text Encoders as Discriminators Rather Than Generators", arXiv:2003.10555 (2020)).

The decoder of the Text Classifier 202 comprises a Fully Connected Layer 308 and a Softmax operation 310. The output of the Text Classifier 202 comprises multi-class text tokens 312. The output text tokens are words or phrases relevant to the incident status extracted from the input text sequence 304 (any sentence of the incoming incident logs).

At runtime, the Text Classifier 202 assigns each output text token a class corresponding to a property of the incident-status object. For example, for an input message: "I saw black smoke gushing out of the tenth-floor windows of Hotel XYZ.", the Text Classifier 202 will output three text tokens: "black smoke", "tenth-floor" and "Hotel XYZ", respectively labeled as "color of smoke", "floor of fire" and "building type". The values: "black", "10" and "hotel", for the corresponding properties of the incident-status object will then be extracted by the Incident Status Tracker 106.

Before the Dispatcher Virtual Assistant 100 can be used for a specific task, the Dispatcher Language Model 104 needs to be trained, and both the Incident Status Tracker 106 and the Natural Language Generator 110 need to be customized for that task. The training data for a specific dispatcher task can be obtained from historical logs of many incidents for that task. These data need to be annotated for training. Empirically, for an incident-status object containing 30 properties, an annotated training corpus of a few thousand log messages are sufficient to train an effective Dispatcher Virtual Assistant of the present invention.

3. The Dispatcher Virtual Assistant Process Cycles

A typical emergency response process is triggered by a citizen making the first call about an emergency incident to a dispatch center. From that moment to the resolution or closure of the incident, there could be tens or even hundreds of calls and text messages concerning the incident, either between citizens (not shown in FIG. 1) and the Call Takers 124, or between the First Responders 126 and the Dispatcher 122, as depicted in FIG. 1. These communications are logged within the CAD system 120.

The role of the Dispatcher Virtual Assistant 100 is to assist the Dispatcher 122 to carry out his/her existing workflows with elevated efficiency and reduced chances of human errors. A great advantage of the present invention is that the DVA can be incorporated into an existing emergency response process without changing the original workflow. That is, the DVA can carry out its own process cycles in parallel with the main workflow.

Major functions of the DVA include (A) updating the incident status in real time, (B) recommending or reminding the dispatcher to take the next action at the right timing, (C) answering the dispatcher's inquiries for task-related information, and (D) fulfilling the dispatcher's request for an incident report. These functions are respectively implemented with four corresponding process cycles. The process cycles for functions (A) and (B) take place autonomously during any active emergency incident, and those for functions (C) and (D) are reactively triggered by the dispatcher. The four process cycles are described in the following passages.

A. Updating the incident status in real time:

(1) Referring to FIG. 1, during an active emergency incident, a new log message is entered into the CAD system 120 by a Call Taker 124 or a First Responder 126.

(2) The message is forwarded to the VA Control Unit 102 via an application programming interface (API).

(3) The VA Control Unit 102 stores the log message to the VA Database 108 and concurrently sends the message to the Dispatcher Language Model 104 for analysis.

(4) From the log message, the Dispatcher Language Model 104 extracts text tokens (words or phrases) relevant to the incident status and sends the result to the Incident Status Tracker 106.

(5) From the text tokens of step (4), the Incident Status Tracker 106 deduces the corresponding property values for the incident-status object.

(6) The Incident Status Tracker 106 sends the updated incident-status object to the VA Control Unit 102, and the latter stores the data to the VA Database 108.

The information flow for this process cycle is depicted sequentially with the arrows 130/132, 134, 136 & 138, 140, 142, and 144.

B. Recommending the dispatcher for the next action:

(1) During an active emergency incident, if the VA Control Unit 102 judges from the current incident status that the Dispatcher 122 should take a new action or complete a pending one, it sends an instruction to the Natural Language Generator 110 for recommending or reminding the Dispatcher 122 to take the proper action.

(2) According to the instruction of step (1), the Natural Language Generator 110 sends a recommendation or reminder message to the VA-GUI 112.

(3) Via the VA-GUI 112, the Dispatcher 122 receives the recommendation or reminder from the DVA 100 for taking his/her next action.

(4) If the aforementioned action involves communicating with the First Responders 126, it is carried out by the Dispatcher 122 with the help of the CAD 120.

The information flow for this process cycle is depicted sequentially with the arrows 146, 148, 150, 152, and 154.

C. Answering the dispatcher's inquiries for task-related information:

(1) During an active emergency incident or a training session, the Dispatcher 122 can ask for task-related information from the DVA 100. Such an inquiry is entered via the VA-GUI 112.

(2) The VA-GUI 112 forwards the inquiry to the VA Control Unit 102.

(3) The VA Control Unit 102 sends the inquiry to the Dispatcher Language Model 104 for analysis.

(4) Having analyzed the intent and context of the dispatcher's inquiry, the Dispatcher Language Model 104 sends a direction to the Natural Language Generator 110 to provide a proper response to the Dispatcher 122.

(5) The Natural Language Generator 110 sends the response to the Dispatcher 122 via the VA-GUI 112.

The information flow for this process cycle is depicted sequentially with the arrows 160, 162, 164, 166, 168, and 170.

D. Fulfilling the dispatcher's request for an incident report:

(1) At any time during or after an emergency incident, the Dispatcher 122 can request the DVA 100 to issue an incident report. Such a request is entered via the VA-GUI 112.

(2) The VA-GUI 112 forwards the request to the VA Control Unit 102.

(3) The VA Control Unit 102 retrieves the latest version of the incident-status object from the VA Database 108 and sends it to the Natural Language Generator 110.

(4) Using the incident-status data received in step (3), the Natural Language Generator 110 produces an incident report and sends it to the CAD 120 for further dispatching.

The information flow for this process cycle is depicted sequentially with the arrows 180, 182, 184, 186, 188, and 190.

In summary, the present invention provides dispatcher virtual assistants (DVA) that can augment the capability of emergency dispatchers while reducing human errors. Major functions of the DVA include updating an emergency incident's status in real time, recommending or reminding the dispatcher to take proper actions at the right timing, answering the dispatcher's inquiries for task-related information, and fulfilling the dispatcher's request for an incident report. The DVA system includes a virtual assistant control unit, a dispatcher language model, an incident-status tracker, a natural language generator, a database and a graphic user interface. It can be used in tandem with an existing CAD system. Furthermore, the DVA can be used as a cost-effective, interactive dispatcher trainer.

Based on machine-learning and deep-learning algorithms, the dispatcher language model is used for extracting the status of a live incident from incoming incident logs, and for processing and answering inquiries or requests from the dispatcher. It is customizable for different types of emergencies and for different local communities.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A virtual assistant (VA) system for augmenting emergency dispatchers' capability in handling live emergency incidents, comprising:

a computer-aided dispatch (CAD) system for logging and sending messages of said emergency incidents;

and a dispatcher virtual assistant comprising:

a VA control unit coupled to said CAD system, for making decisions and directing information flows, either based on incoming incident logs of an incident, or according to inquiries or requests from a dispatcher;

a dispatcher language model coupled to the VA control unit, for extracting, in real time, incident-status-related text fragments from said incident logs, and for analyzing said inquiries or said requests from said dispatcher;

an incident state tracker coupled to the VA control unit, for deducing, in real time, an incident-status object comprising a set of properties that describes aspects of said incident from said incident-status-related text fragments;

a VA database coupled to the VA control unit, for storing dispatcher-task-related information, said incident logs and property values of said incident-status object;

a natural language generator coupled to the VA control unit, for generating text messages or incident reports, either autonomously based on said property values of said incident-status object, or reactively according to said inquiries or said requests from said dispatcher; and a VA graphic user interface coupled to the VA control unit, for said dispatcher to communicate with said VA system;

wherein when a call-taker logs an incident message into said CAD system, the following sequence of operations occur autonomously:

said CAD system forwards said incident message to said VA control unit;

said VA control unit stores said incident message to said VA database and concurrently forwards said incident message to said dispatcher language model for analysis;

said dispatcher language model extracts text fragments relevant to said incident's status from said incident message and sends said text fragments to said incident state tracker;

said incident state tracker deduces an updated incident-status object from said text fragments and sends said updated incident-status object to said VA control unit;

according to said updated incident-status object, said VA control unit instructs said natural language generator to generate an action-recommendation message and sends said action-recommendation message to said VA graphic user interface;

an emergency dispatcher receives said action-recommendation message from said VA graphic user interface; and using said action-recommendation message as a reference, said emergency dispatcher communicates via said CAD system with one or more first responders for ensuing actions;

wherein a text classifier comprises:

a pre-trained text encoder of the Bidirectional Encoder Representations from Transformers (BERT) family; and a decoder comprising a fully connected layer and a Softmax operation;

wherein said text classifier takes said incident logs, sentence by sentence, as input and extracts text fragments, labeled with properties of said incident-status object, as output.

2. The virtual assistant system of claim 1, wherein said dispatcher language model comprises:

a text classifier for extracting said incident-status-related text fragments from said incident logs;

a natural language understanding model for analyzing intents of said inquiries or said requests received from said dispatcher; and a contextual dialog management model for analyzing contexts of said inquiries or said requests received from said dispatcher.

3. The virtual assistant system of claim 1, wherein:

said dispatcher virtual assistant system autonomously extracts updated property values of said incident-status object from said incident logs in real time, autonomously recommends or reminds said dispatcher to take proper actions at right timing based on said updated property values of said incident-status object, processes and answers said dispatcher's inquiries for dispatcher-task-related information, and generates incident reports according to said dispatcher's requests.

* * * * *